United States Patent [19]
Helicher

[11] Patent Number: 5,520,985
[45] Date of Patent: May 28, 1996

[54] COLLECTABLE CARD ASSEMBLY

[76] Inventor: Leonard Helicher, 4313 18th Ave., Brooklyn, N.Y. 11218

[21] Appl. No.: 398,105
[22] Filed: Mar. 3, 1995
[51] Int. Cl.⁶ ........................................ B32B 7/06
[52] U.S. Cl. .......................... 428/192; 428/202; 428/195; 40/124.1
[58] Field of Search ............................ 428/76, 192, 202, 428/195; 40/124.1

Primary Examiner—Alexander S. Thomas
Attorney, Agent, or Firm—Bauer & Schaffer

[57] ABSTRACT

The pair of card members bearing visual indicia on each side are laminated with a plastic film interposed therebetween so that each of the card members is removably adhered to the film to create a cohesive single card assembly.

7 Claims, 1 Drawing Sheet

COLLECTABLE CARD ASSEMBLY

FIELD OF THE INVENTION

The present invention relates to collectable cards, such as baseball cards, business cards, advertizing cards, credit cards, "calling cards" and the like, having an intrinsic value, determined by its initially intended use and an extrinsic value as an ultimately "collectible" item.

BACKGROUND OF THE INVENTION

Items such as promotional and informational cards are used in many fields. Once such cards have fulfilled their initial purpose, the collecting and trading of such cards has become a popular activity among collectors. What had been for many years a hobby has now become a serious business in buying and selling cards. Some of these cards have become quite valuable because of their rarity, their subject matter, or the acquired fame of the person depicted on the card. The value of rare cards has become increasingly high.

Conventional printing technology has permitted the production of single cards having at most two surfaces. Thus, the advertiser is limited to advertise on only the two sides of the card. Thus, if the messages or information that the advertiser wants to convey to the public are long or complex, the printing and set up of the card must shrink proportionally, thereby diminishing the effect and impact on the consumer. Or, if the merchant wants to advertise as well as provide the consumer with a "collectable", the conventional card is not fully suitable. Furthermore, the message finally printed on the card may not necessarily be capable of conveying exactly the message the advertiser needs to convey or may limit him on the subject matter of his marketing communication. Finally, since the advertisers are constrained by the printing surfaces of the card, they are forced to print even more single cards and expend resources to distribute them and more critically spend millions of dollars on marketing strategies to create new innovative ways of placing messages and advertisements on cards, thereby increasing the cost of the products and services to consumers.

Similarly, conventional printing technology forces the collector who is completing the purchase of a card to receive only one single collector card; a card that is frequently expensive and which requires a great deal of care to retain any permanence or real or intrinsic value; a card that delivers limited information for lack of space, and which leaves the collector thirsting for more. But what is even worse for a collector is to purchase or receive a collectible card that has been tainted with an advertisement of a merchant at, for example, in a lower hand corner, thereby decreasing the value of the card and diminishing the marketing effect.

It is, therefore, an object of the present invention to provide a collectable card assembly which will increase the ability of advertisers to market their products and services, and simultaneously give the collectors the valuable cards they are looking for.

It is, therefore, an object of the present invention to provide an improved card having increased information and value as a collectable card.

It is a further object of the present invention to provide a card which contains at least two card members initially combined into an integral unitary assembly and which is capable of being separated into its component members to provide multiple "cards."

These objects as well as other objects and advantages will be apparent from the following disclosure of the invention.

DETAILED DESCRIPTION OF THE PREFERRED EMBODIMENTS

Figure 1:
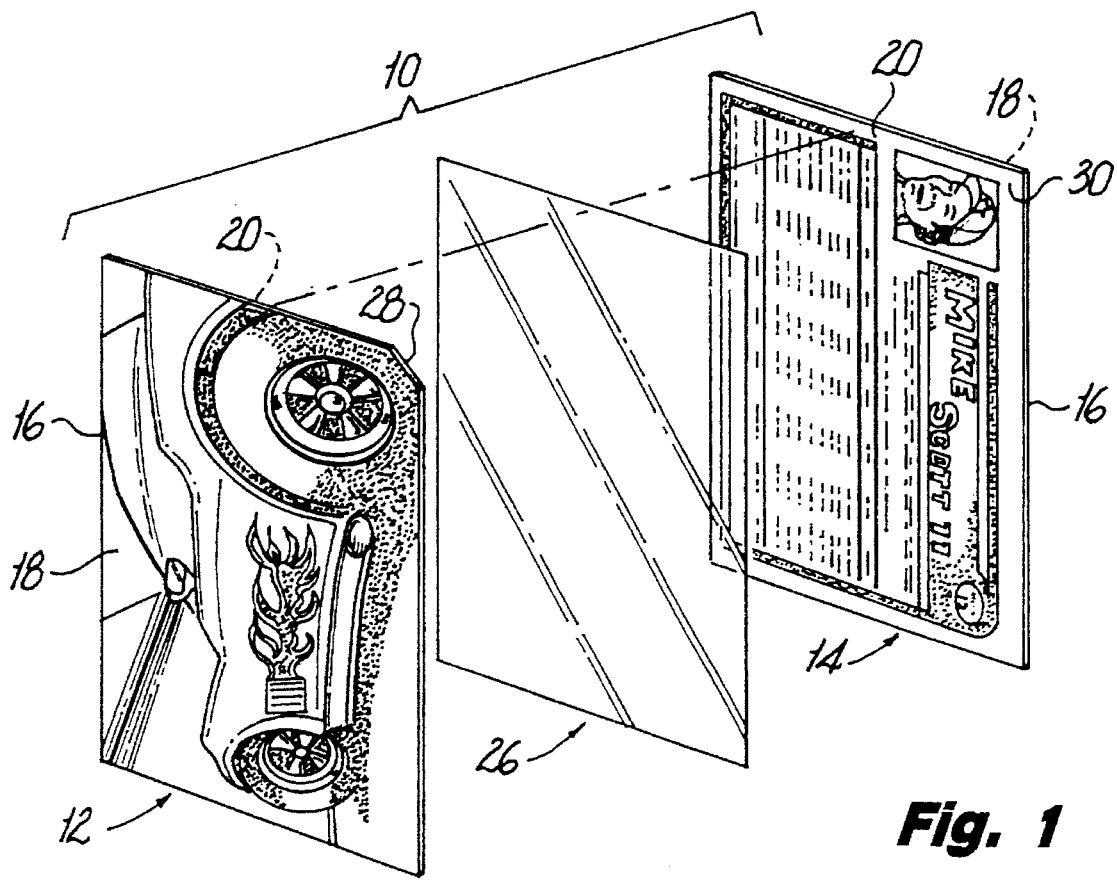
FIG. 1 is an exploded view of a preferred embodiment of the present invention, an enhanced image collectable card assembly.

Referring to FIG. 1 there is illustrated a card assembly embodying the teachings of the present invention. The assembly generally identified by reference numeral 10 comprises a pair of card members 12 and 14. Each card member is complete in and of itself comprising a substrate 16, such as paper, pasteboard, cardboard, sheet plastic and the like. Each card member has obverse and reverse faces 18 and 20 on each of which indicia (pictorial, written, graphic, electronic, magnetic, and/or the like) are applied. The selection of the pictorial written or graphic information is determined by the nature of the advertisement, calling card or the like intended by the publisher or advertiser. Preferably each surface provides a distinctive, desirable and unique presentation.

The individual card members are each finished by providing either or both obverse and reverse faces with plastic surfaces. That is, should the card be formed of a paper or pasteboard substrate, the plastic surface may be applied by coating the surfaces using conventional brush and/or roller techniques. On the other hand, the substrate may be formed entirely from plastic material such as polyethylene, polypropylene, and polyvinyl chloride, eliminating the need to apply a coating thereto. The indicia may be printed or applied in the plastic by conventional techniques also.

The assembly 10 is completed by placing the two cards back to back (reverse to reverse) and laminating the two cards 12 and 14 together, interposing between their reverse sides or between the reverse side 20 of one card and the other card's obverse side 18 of the other card a thin plastic film 26. The thin plastic film may be made of polyvinylidene chloride such as is commercially available from Dow Chemical under the trademark SARAN. Preferably, the sheet should be as thin as possible, being no more than one or two millimeters thick.

Figure 2:
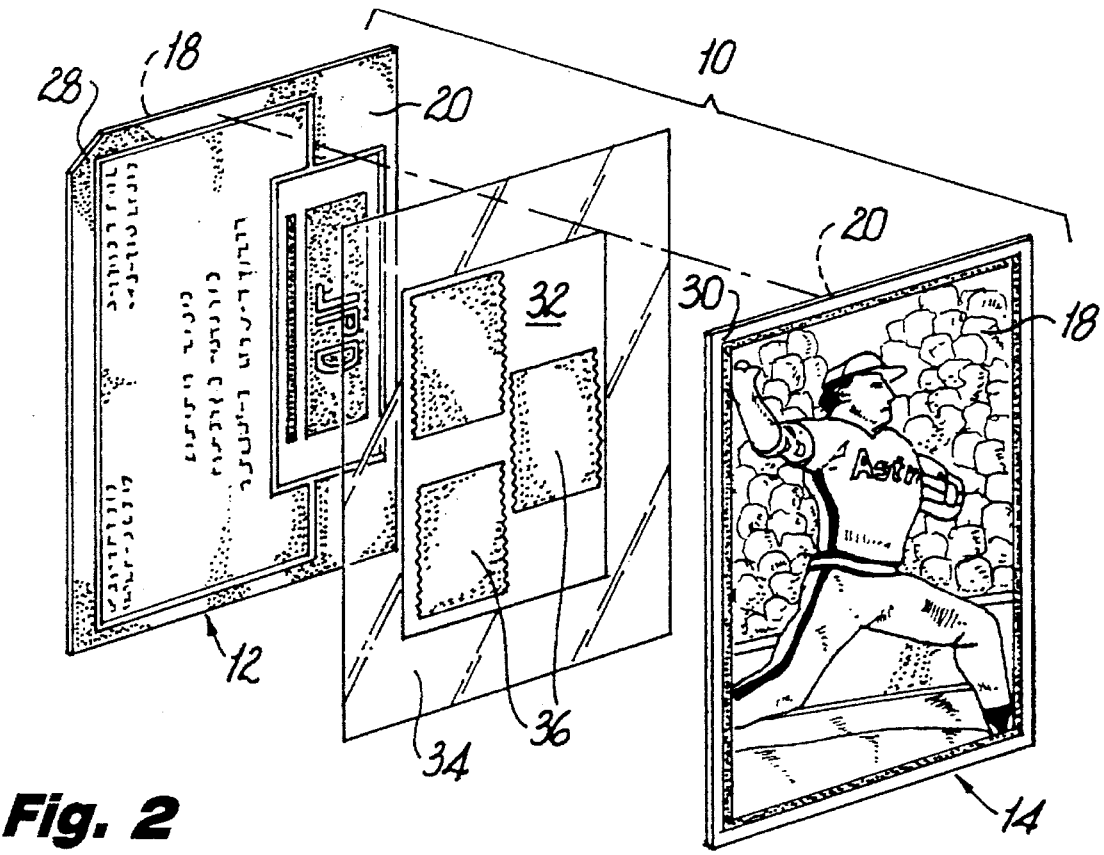
FIG. 2 is an exploded rear view of the collectable card assembly shown in FIG. 1.

The present invention lends itself to the hiding or storage of selected items between the individual cards, while maintaining the apearance, feel and integrity of a unitary card. For example, the thin plastic insert 26 may, in fact, be a silver negative on which a picture has been chemically formed or etched. On the other hand, the film or negative may, as seen in FIG. 2, be cut out in its interior to provide a pocket 32 surrounding a continuous peripheral frame 34 and which permits placement within the frame of such valuable flat sheet items as postage stamps 36, business cards, advertisements, coupons or the like. Thus, when the assembly is completed under heat and pressure, the valuable stamps or coupons are securely contained. The coupons will be released upon snapping or separating the assembly.

The assembly is preferably laminated by feeding the two cards and interposed thin sheet through a press or series of compression rollers under mild heat. Under pressure and heat, the assembly will be firmly and fixedly sealed together due to the chemical and physical properties of the plastic sheet and the plastic surfaces of the cards. Conventional calendaring presses, roller presses and the like may be employed in the lamination of the cards, and the temperature of heat and the pressure applied being adjusted to the plastic material being used. It is not intended to permanently fuse the plastic surfaces together and, therefore, more pressure rather than heat is significant.

As a result of that compression and the thinness of the cards and interposed film sheet, the assembly takes on the characteristics and attribute of a single card, wherein the obverse of one card becomes the reverse surface of the assembly. In this condition the card may be manipulated with reasonable care. It may be inserted in vending machines or the like and may even be embossed with tactile indicia and passed through credit machines.

After use and when desired, the assembly may be separated into its two components by breaking the seal between the cards created by the thin plastic film. This may be accomplished by snapping the two cards, i.e. by quickly bending the cards, so that the radius of bending of the cards differ. In this manner, the individual are released from adherence with the plastic film and come apart. When this occurs, a loud snap or crack is heard. Inserting a sharp tool or other instrument between the cards to allow air to enter between the film and plastic surfaces may also separate the cards.

Separation can be facilitated by providing one corner of one card with a slight cut back 28, thus allowing the other card to have a tab like overhang 30 which can be grabbed by the user to separate the cards.

Although the figures illustrate the case of a central transparent plastic insert 26 formed entirely of polyvinylidene chloride film, this example is not intended to be a limitation on the scope of the invention. It should be appreciated that the central transparent plastic insert 26 may be formed of any plastic transparent material which is sufficient to hold the two image or letter bearing cards together after the necessary application of heat and pressure and yet with the ability to permit the release of the cards when it is desired to release or snap the assembly apart.

Furthermore, even though the figures illustrate the case of the card members of the assembly 22 and 23 as rectangular, this example is not intended to be a limitation on the scope of the invention. It should be appreciated that the card members 22 and 23 may be designed to have any shape such as triangular, square, pentagonal, hexagonal, and the like, or even circular.

Accordingly, it is intended that the present disclosure be taken as illustrative of the present invention and not limiting thereof.

What is claimed is:

1. A decorative card assembly comprising a pair of card members bearing visual indicia on each side thereof, each said card member having at least one side provided with a plastic surface, and a plastic film interposed between said card members with the plastic surfaces facing each other and laminated so that each of said one plastic side of said card members is removably adhered to said film to create a cohesive single card assembly of said pair of cards.

2. The decorative card assembly in accordance with claim 1, wherein said plastic film is such that the card members are removably separable from said film to expose the indicia on said at least one side.

3. The decorative card according to claim 2, wherein said film is provided with at least one cutout forming a pocket in which other sheet or film material may be placed.

4. The decorative card assembly in accordance with claim 1, wherein said card members are made of a paper material covered with plastic.

5. The decorative card assembly in accordance with claim 1, wherein said card members are plastic selected from the group consisting of polyethylene, polypropylene, and polyvinyl chloride.

6. The decorative card assembly in accordance with claim 1, wherein said plastic film is polyvinylidene chloride.

7. A decorative card assembly comprising a pair of identically shaped card members each bearing visual indicia on each side thereof, each said card member having at least one side provided with a plastic surface and having a peripheral edge, a plastic film interposed between said card members with the plastic surfaces facing each other and laminated so that each of said one plastic side of said card members is removably adhered to said film to create a cohesive card assembly, at least one of said card members being provided with a recess along its peripheral edge exposing a comparable portion of the peripheral margin of the other card member providing said other card member with a tab by which separation is facilitated.

* * * * *